United States Patent
Grandjean et al.

(10) Patent No.: US 12,305,136 B2
(45) Date of Patent: May 20, 2025

(54) METHOD FOR REMOVING ACID COMPOUNDS FROM A GASEOUS EFFLUENT USING A TERTIARY AMINE-BASED ABSORBENT SOLUTION

(71) Applicant: IFP Energies nouvelles, Rueil-Malmaison (FR)

(72) Inventors: Julien Grandjean, Rueil-Malmaison (FR); Thierry Huard, Rueil-Malmaison (FR); Aurelie Wender, Rueil-Malmaison (FR); Francois Grosjean, Rueil-Malmaison (FR); Jean Kittel, Rueil-Malmaison (FR); Abdelkader Lettat, Rueil-Malmaison (FR); Marie Dehlinger, Rueil-Malmaison (FR); Aurelie Mouret, Rueil-Malmaison (FR); Xavier Courtial, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 484 days.

(21) Appl. No.: 17/777,456

(22) PCT Filed: Dec. 1, 2020

(86) PCT No.: PCT/EP2020/084178
§ 371 (c)(1),
(2) Date: May 17, 2022

(87) PCT Pub. No.: WO2021/121983
PCT Pub. Date: Jun. 24, 2021

(65) Prior Publication Data
US 2023/0357658 A1 Nov. 9, 2023

(30) Foreign Application Priority Data
Dec. 16, 2019 (FR) ...................... 1914512

(51) Int. Cl.
*C10L 3/10* (2006.01)
*B01D 53/14* (2006.01)
(Continued)

(52) U.S. Cl.
CPC .......... *C10L 3/103* (2013.01); *B01D 53/1425* (2013.01); *B01D 53/1462* (2013.01);
(Continued)

(58) Field of Classification Search
CPC ..... C10L 3/103; C10L 3/104; B01D 53/1425; B01D 53/1462; B01D 53/1493; B01D 53/526; B01D 53/62; B01D 53/96
(Continued)

(56) References Cited

U.S. PATENT DOCUMENTS

| 6,267,939 B1 | 7/2001 | Gemes et al. |
| 6,852,144 B1 | 2/2005 | Wagner et al. |
| 2022/0274050 A1 | 9/2022 | Carlier |

FOREIGN PATENT DOCUMENTS

| FR | 2877858 A1 | 5/2006 |
| FR | 2895273 A1 | 6/2007 |

(Continued)

OTHER PUBLICATIONS

English Translation of International Search Report (ISR) mailed Feb. 3, 2021 in International Application No. PCT/EP2020/084178.

*Primary Examiner* — Anita Nassiri-Motlagh
(74) *Attorney, Agent, or Firm* — FITCH, EVEN, TABIN & FLANNERY, LLP (57) ABSTRACT

The present invention relates to a process for removing acid compounds contained in a gaseous effluent which consists in bringing a gaseous effluent into contact, in the absorption column, with an absorbent solution comprising water,
(Continued)

between 20% and 28% by weight of pentamethyldipropyl-enetriamine and between 5% and 35% by weight of N-methyldiethanolamine.

20 Claims, 1 Drawing Sheet (51) Int. Cl.
*B01D 53/52* (2006.01)
*B01D 53/62* (2006.01)
*B01D 53/96* (2006.01)

(52) U.S. Cl.
CPC ....... B01D 53/1493 (2013.01); B01D 53/526 (2013.01); B01D 53/62 (2013.01); B01D 53/96 (2013.01); C10L 3/104 (2013.01); B01D 2252/103 (2013.01); B01D 2252/20415 (2013.01); B01D 2252/20431 (2013.01); B01D 2252/20447 (2013.01); B01D 2252/20489 (2013.01); B01D 2252/504 (2013.01); B01D 2252/602 (2013.01); B01D 2256/245 (2013.01); *B01D 2257/304* (2013.01); *B01D 2257/306* (2013.01); *B01D 2257/308* (2013.01); *B01D 2257/504* (2013.01); *B01D 2258/05* (2013.01)

(58) Field of Classification Search
USPC .......................................................... 423/229
See application file for complete search history.

(56) References Cited

FOREIGN PATENT DOCUMENTS

| FR | 2898284 | A1 | 9/2007 | |
|---|---|---|---|---|
| FR | 2900842 | A1 | 11/2007 | |
| FR | 2900843 | A1 | 11/2007 | |
| FR | 2986441 | A1 | 8/2013 | |
| FR | 2986442 | A1 | 8/2013 | |
| FR | 3014101 | A1 | 6/2015 | |
| WO | WO-2004082809 | A1 * | 9/2004 | ......... B01D 53/1493 |
| WO | 2009/156273 | A1 | 12/2009 | |
| WO | 2015/177333 | A1 | 11/2015 | |

* cited by examiner

METHOD FOR REMOVING ACID COMPOUNDS FROM A GASEOUS EFFLUENT USING A TERTIARY AMINE-BASED ABSORBENT SOLUTION

CROSS-REFERENCE TO RELATED APPLICATIONS

This application is a U.S. national phase application filed under 35 U.S.C. § 371 of International Application No. PCT/EP2020/084178, filed Dec. 1, 2020, which claims benefit of the foiling date of French patent application no. 1914512, filed Dec. 16, 2019, the contents of both of which are incorporated herein by reference in their entireties.

TECHNICAL FIELD

The present invention relates to the field of processes for the deacidification of a gaseous effluent The invention advantageously applies to the treatment of gas of industrial origin, of natural gas and of gas resulting from biomass fermentation.

PRIOR ART

Use is commonly made of processes for the deacidification of gases employing aqueous solutions of amines for removing the acid compounds present in a gas, in particular carbon dioxide ($CO_2$), hydrogen sulfide ($H_2S$), carbon oxysulfide (COS), carbon disulfide ($CS_2$), sulfur dioxide ($SO_2$) and mercaptans (RSH), such as methyl mercaptan ($CH_3SH$), ethyl mercaptan ($CH_3CH_2SH$) and propyl mercaptan ($CH_3CH_2CH_2SH$). The gas is deacidified by bringing into contact with the absorbent solution and then the absorbent solution is regenerated thermally.

These processes for the deacidification of acid gases are also commonly known as "solvent scrubbing" with a "chemical" solvent, in contrast to the "physical" solvent use for the absorption, which is not based on carrying out chemical reactions but on the solubility directly dependent on and proportional to the partial pressure of the entities in the gas phase. The partial pressure is the product of the concentration of the entities in the phase multiplied by the total operating pressure. A "chemical" solvent advantageously benefits from the two effects for increasing the solubility of the entities.

A chemical solvent corresponds to an aqueous solution comprising a reactant which reacts preferentially with the acid compounds ($H_2S$, $CO_2$, COS, $CS_2$, and the like) present in the treated gas in order to form salts, without reacting with the other non-acid compounds of the gas. The treated gas, after bringing into contact with the solvent, is then depleted in acid compounds, which are selectively transferred in the form of salts into the solvent. The chemical reactions are reversible, which makes it possible for the solvent, loaded with acid compounds, to be subsequently deacidified, for example under the action of heat, in order to release, on the one hand, the acid compounds in the gas form, which can then be stored, transformed or used for various applications, and in order, on the other hand, to regenerate the solvent, which returns to its initial state and can thus be reused for a new phase of reaction with the acid gas to be treated. The phase of reaction of the solvent with the acid gas is commonly known as the absorption phase and that where the solvent is deacidified is known as the phase of regeneration of the solvent.

In general, the performance qualities of the separation of the acid compounds from the gas, in this context, depend mainly on the nature of the reversible reaction chosen. Conventional processes for the deacidification of acid gases are generally "amine" processes, that is to say that they are based on the reactions of the acid compounds with amines in aqueous solution. These actions come within the general context of acid/base reactions. $H_2S$, $CO_2$ or COS are, for example, acid compounds, in particular in the presence of water, whereas amines are basic compounds. The mechanisms of the reactions and the nature of the salts obtained generally depend on the structure of the amines employed.

For example, the document U.S. Pat. No. 6,852,144 describes a method for the removal of acid compounds from hydrocarbons using an absorbent aqueous solution of N-methyldiethanolamine (MDEA) or of triethanolamine containing a high proportion of at least one compound belonging to the following group: piperazine and/or methylpiperazine and/or morpholine.

The performance qualities of the processes for the deacidification of acid gases by scrubbing with amines are directly dependent on the nature of the amine(s) present in the solvent. These amines can be primary, secondary or tertiary. They can exhibit one or more equivalent or different amine functional groups per molecule.

In order to improve the performance qualities of deacidification processes, there is a continual search for ever more effective amines, in particular ones capable of absorbing a greater amount of acid gases and of being regenerated with less energy.

One limitation on the absorbent solutions currently used in "selective" deacidification applications is an insufficient absorption selectivity for $H_2S$ with respect to $CO_2$. This is because, in some cases of deacidification of natural gas, a selective removal of $H_2S$ is sought for while limiting the absorption of $CO_2$ as much as possible. This restriction is particularly important for gases to be treated already containing a $CO_2$ content less than or equal to the desired specification. A maximum absorption capacity for $H_2S$ with a maximum absorption selectivity for $H_2S$ with respect to $CO_2$ is then sought for. This selectivity makes it possible to maximize the amount of gas treated and to recover an acid gas at the regenerator outlet having the greatest possible concentration of $H_2S$, which limits the size of the units of the sulfur line downstream of the treatment and guarantees better operation of the units. In some cases, a unit for enriching in $H_2S$ is necessary to concentrate the acid gas in $H_2S$. The most selective amine is also sought for amine scrubbing units of this type installed in order to treat the acid gas.

It is well known that tertiary amines or secondary amines with severe steric hindrance have slower kinetics for capturing $CO_2$ than less hindered primary or secondary amines. On the other hand, amines, and in particular tertiary or secondary amines with severe steric hindrance, generally have instantaneous kinetics of capturing $H_2S$. Consequently, it is possible to carry out, with these tertiary and secondary amines with severe stearic hindrance, selective removal of $H_2S$ based on distinct kinetic performance qualities.

Tertiary amines, such as MDEA, or hindered secondary amines exhibiting slow reaction kinetics with $CO_2$ are thus commonly used. However, they exhibit limited selectivities at high levels of charging with acid gases.

Another limitation on numerous absorbent solutions commonly used in total deacidification applications is excessively slow kinetics of absorption of $CO_2$ or COS. In the case where the desired specifications with regard to $CO_2$ or COS are extreme, i.e. close to complete purification from these compounds, it is generally the case that the fastest possible reaction kinetics are sought, so as to reduce the height of the absorption column. This is because, if the reactions are slow, the use has to be envisaged of very high columns in order to allow enough time for the chemical reaction to take place. In point of fact, the absorption columns represent a major part of the capital costs of the process, in particular when pressurized installations are concerned.

Whether maximum kinetics of absorption of $CO_2$ and COS in an application of total deacidification of all the acid contaminants or minimum kinetics of capturing of $CO_2$ in a selective deacidification application (selective absorption of $H_2S$ with respect to $CO_2$) are sought, there is always a desire to use an absorbent solution having the greatest possible cyclic capacity with regard to the contaminants which it is desired to remove from the gaseous effluent treated, e.g. natural gas. This cyclic capacity, denoted $\Delta\alpha$, corresponds to the difference in loading level ($\alpha$ denoting the number of moles of acid compounds absorbed $n_{acid\ gas}$ per kilogram of absorbent solution) between the absorbent solution withdrawn at the bottom of the absorption column and the absorbent solution feeding the said column. This is because the greater the cyclic capacity of the absorbent solution, the more restricted will be the flow rate of absorbent solution which it is necessary to employ in order to deacidify a gas to be treated. In gas treatment processes, the reduction in the flow rate of absorbent solution generally has a strong impact on the reduction in the capital costs, in particular at the dimensioning of the columns, if it is possible to reduce their diameter, but also by reducing the size of the other items of equipment, such as heat exchangers, pumps and flash drums.

Another essential aspect of operations for the treatment of gases or for cleaning industrial flue gases by a solvent remains the regeneration of the separating agent in order to purify the solvent from the contaminants which it has accumulated in the absorption phase. Depending on the type of absorption (physical and/or chemical), regeneration by reduction in pressure and/or by distillation and/or by entrainment by a vaporized gas, known as "stripping gas", is generally envisaged. The energy consumption necessary for the regeneration of the solvent can be very high, which is particularly true in the case where the partial pressure of the acid gases is low, or when the chemical bonding forces are high, and can represent a considerable operating cost for the deacidification process.

It is well known to a person skilled in the art that the energy necessary for the regeneration by distillation of an amine solution can be broken down according to three different headings: the energy necessary to heat the absorbent solution between the top and the bottom of the regenerator, the energy necessary to lower the partial pressure of acid gases in the regenerator by vaporization of a stripping gas and, finally, the energy necessary to break the chemical bond between the amine and the acid compound. These first two headings are proportional to the flow rates of the absorbent solution which it is necessary to circulate in the unit in order to achieve a given purification performance, i.e. a specification, of the solvent to be regenerated. In order to reduce the energy consumption associated with the regeneration of the solvent, it is thus preferable yet again to maximize the cyclic capacity of the solvent. This is because the greater the cyclic capacity of the absorbent solution, the more restricted can be the flow rate of absorbent solution which it is necessary to employ in order to deacidify a gas to be treated.

In the search for more effective amines which make it possible to reduce the circulation flow rate and the regeneration energy, U.S. Pat. No. 6,267,939 and Patent Application WO09156273 provide an absorbent solution based on particular polyamines, such as N,N,N',N'-tetramethyldipropylenetriamine (TMDPTA) or pentamethyldiethylenetriamine (PMDETA).

With the aim also of reducing the regeneration energy of the deacidification process, the documents FR 2 877 858, FR 2 895 273, FR 2 900 843, FR 2 898 284, FR 2 900 842, FR 2 986 441 and FR 2 986 442 provide for the use of an absorbent solution which forms two phases when it absorbs an amount of acid gases, so that only the phase loaded with the acid gases requires regeneration. However, this solution comprises the disadvantage of not being compatible with a conventional high-pressure deacidification plant as it requires additional stages and items of equipment and multiple precautions in order to keep the operation under control. This is because the separation into two liquid phases of a single-phase liquid absorbent solution, also known as demixing phenomenon, can cause serious operating problems during the absorption or at higher temperature, upstream or during the regeneration stage if the process and the items of equipment are not suitable for treating the two phases. These problems are described in particular in the documents FR 3 014 101 and WO2015177333. Under the operating conditions of the absorber, also known as absorption column, this liquid/liquid phase separation can disrupt the transfer of the acid gas to the absorbent solution and render the column unstable. It can also disrupt the liquid/vapour phase equilibrium, which is very important for the performance of the deacidification cycle, in particular for the regeneration stage. It can in addition cause sudden changes in the composition of the liquid streams, irregular flows, such that the process becomes unstable, its control impossible and its performance random.

Another problem lies in the stability of the absorbent solution, in particular the thermal stability of the amines. The absorbent solution can decompose under the effect of the temperature, which limits the operating conditions of the process, in particular the temperature at which the regeneration of the solvent is carried out. By way of example, to increase the temperature of the regenerator by 10° C. doubles the rate of thermal decomposition of monoethanolamine (MEA). The regeneration of the aqueous solutions of alkanolamines, such as MEA, is thus carried out at regenerator bottom temperatures of the order of 120° C., indeed even 130° C. for the more stable amines, such as MDEA. As a result of these regenerator bottom temperatures, the acid gases ($CO_2$, $H_2S$, COS, $CS_2$, and the like) are obtained at moderate pressures, from 0.1 to 0.3 MPa. Depending on the nature of the regenerated acid gas and the applications, the acid gas can be sent to a treatment unit or else compressed in order to be reinjected and sequestered. For the purpose in particular of overcoming this thermal stability problem, Patent Application WO04082809 provides, for example, for the use of aqueous absorbent solutions comprising a high concentration, typically of greater than 60%, of a tertiary polyamine, for example pentamethyldipropylenetriamine (PMDPTA).

Yet other problems are commonly encountered, such as the corrosiveness of the absorbent solutions, or also the foaming of the absorbent solutions.

This is because the absorbent solutions based on amines, for example based on alkanolamines, such as MEA, diethanolamine (DEA) or MDEA, are known to be corrosive with regard to items of equipment made of steel used in processes for the deacidification of gaseous effluents. These corrosion risks require that fairly restrictive measures be taken, such as, for example, that items of equipment be made of corrosion-resistant alloys, which may be more expensive or less resistant mechanically, or that corrosion inhibitors be used, which add to the cost of the solution, accumulate irreversibly and potentially in a fouling manner and the presence of which at the valid contents it is advisable to continuously monitor.

The foaming of the absorbent solutions is a known problem in the deacidification of gaseous effluents, which can have various harmful consequences, such as premature obstruction of the absorption or regeneration columns, resulting in a fall in the production capacity, a treated gas outside the targeted specifications, losses of amines by entrainment in the treated gas or the acid gas, indeed even in shutdown of the unit. It is known that amine absorbent solutions have a tendency to foam, in particular when they are in contact with liquid hydrocarbons. This problem is often solved by the addition of anti-foaming agents, which yet again increase the operating costs and complicate the process (need to monitor the content, addition of filters, and the like).

In this context, it is difficult to find a formulation of absorbent compounds making it possible to remove the acid compounds in any type of effluent, making it possible for the deacidification process to operate at lower operating costs (including the regeneration energy) and capital costs (including the cost of the absorption column), and which meet the requirements of absorption capacity, of selectivity, of chemical stability, in particular towards temperature, of low corrosiveness and limiting the foaming.

OBJECTIVES AND SUMMARY OF THE INVENTION

It is thus an objective of the present invention to meet the needs of the prior art and to overcome one or more of the abovementioned disadvantages of the prior art.

The present invention thus provides a process for removing acid compounds, such as $CO_2$, $H_2S$, COS, $CS_2$ or mercaptans, from a gas, employing an aqueous absorbent solution comprising the particular combination of at least two specific amines, which exhibits, unexpectedly, at least one of the following effects:
  a limitation of foaming, in comparison with conventional solutions, in particular in the presence of hydrocarbons and under degraded conditions, such as those of units in operation;
  a lower corrosiveness in comparison with conventional solutions;
  a greater stability, i.e., a reduced degradation, in particular in the presence of molecular oxygen, in comparison with absorbent solutions based on polyamines according to the prior art.

In addition, the inventors have demonstrated that the use of this particular combination of specific amines in aqueous solution, with an activator, such as piperazine, can improve the cyclic absorption capacity and the kinetics of absorption of $CO_2$ in comparison with a reference formulation, such as a mixture of MDEA and piperazine.

The absorbent solutions according to the invention can also make it possible to limit the flow rate of absorbent solution to be used in the process, as a result of the good performance qualities in terms of cyclic capacity for absorption of acid gases, in particular $CO_2$ and $H_2S$, and of absorption selectivity with respect to $H_2S$. These performance qualities are superior to those of MDEA and also to those of polyamines cited in the prior art, and in particular, for the latter, in terms of cyclic capacity for absorption of acid gases.

According to the present invention, the absorbent solution is advantageously in a single-phase form under the operating conditions of the process, more particularly at least under the absorption conditions and up to the entry of the solution into the regenerator, which makes it possible in particular to dispense with a stage of post-absorption separation by settling.

Thus, the present invention provides, according to a first aspect, a process for the removal of the acid compounds contained in a gaseous effluent, comprising carrying out a stage of absorption of the acid compounds by bringing the gaseous effluent into contact with an absorbent solution comprising:
  water;
  between 20% and 28% by weight of pentamethyldipropylenetriamine;
  between 5% and 35% by weight of N-methyldiethanolamine.

According to one or more implementations of the invention, the absorbent solution comprises between 10% and 30% by weight of N-methyldiethanolamine and preferably between 42% and 70% by weight of water.

According to one or more implementations of the invention, the absorbent solution comprises between 37% and 75% by weight of water.

According to one or more implementations of the invention, the absorbent solution comprises:
  between 5% and 20% by weight of N-methyldiethanolamine; and
  between 0.5% and 20% by weight of at least one activating compound comprising a primary or secondary amine functional group chosen from the group consisting of:
  piperazine;
  1-methylpiperazine;
  homopiperazine;
  N-(2-hydroxyethyl)piperazine;
  3-(methylamino)propylamine;
  N,N'-dimethyl-1,6-hexanediamine;
  N-methyl-1,6-hexanediamine;
  N,N',N'-trimethyl-1,6-hexanediamine;
  2-amino-2-methyl-1-propanol.

In this case, the absorbent solution can comprise between 5% and 15% by weight of N-methyldiethanolamine and preferably between 10% and 15% of N-methyldiethanolamine.

Preferably, the activating compound is piperazine.

Advantageously, the absorbent solution comprises between 0.5% and 10% by weight of the said at least one activating compound, preferably between 0.5% and 6% by weight of the said at least one activating compound and more preferentially still between 1% and 6% by weight of the said at least one activating compound.

According to one or more implementations of the invention, the absorbent solution additionally comprises at least one physical solvent chosen from the group consisting of methanol, ethanol,
  2-ethoxyethanol, triethylene glycol dimethyl ether, tetraethylene glycol dimethyl ether,
  pentaethylene glycol dimethyl ether, hexaethylene glycol dimethyl ether, heptaethylene glycol dimethyl ether, octaethylene glycol dimethyl ether, diethylene glycol butoxyacetate, glycerol triacetate, sulfolane, N-methylpyrrolidone,
N-methylmorpholin-3-one, N,N-dimethylformamide, N-formylmorpholine,
N,N'-dimethylimidazolidin-2-one, N-methylimidazole, ethylene glycol, diethylene glycol,
triethylene glycol, thiodiglycol, propylene carbonate and tributyl phosphate.

According to one or more implementations of the invention, the absorbent solution does not comprise an antifoaming additive.

According to one or more implementations of the invention, the stage of absorption of the acid compounds is carried out at a pressure of between 0.1 MPa and 20 MPa and at a temperature of between 20° C. and 100° C.

According to one or more implementations of the invention, an absorbent solution loaded with acid compounds is obtained after the absorption stage, and the process comprises carrying out at least one stage of regeneration of the said absorbent solution loaded with acid compounds at a pressure of between 0.1 MPa and
1 MPa, preferably of between 0.1 MPa and 0.5 MPa, and at a temperature of between 100° C. and 180° C., preferably of between 110° C. and 140° C.

According to one or more implementations of the invention, the absorbent solution is a single-phase solution during the absorption stage within an absorption column and up to at least the entry into a regeneration column in which the regeneration stage is carried out, and preferably has a temperature of less than or equal to 110° C. in the absorption column and up to at least the entry into the regeneration column.

According to one or more implementations of the invention, the gaseous effluent is chosen from natural gas, synthesis gas, combustion flue gases, refinery gases, acid gases resulting from an amine unit, tail gases resulting from a unit for the conversion of $H_2S$ to give sulfur by the Claus process, gases resulting from biomass fermentation, gases from cement works or incinerator flue gases.

The process according to the invention can be employed for the selective removal of $H_2S$ with respect to $CO_2$ from a gaseous effluent comprising $H_2S$ and $CO_2$, preferably from natural gas.

The process according to the invention can also be employed for the decarbonization of a biogas.

Other subject-matters and advantages of the invention will become apparent on reading the description which follows of particular exemplary embodiments of the invention, given by way of non-limiting examples, the description being made with reference to the appended FIGURE described below.

LIST OF FIGURES

FIG. 1 represents a flow sheet of the process for the treatment of acid gas effluents. This illustration does not comprise all of the components necessary for the implementation of the process, for example heat exchangers, pumps, mixers, and the like. Only the elements necessary for the understanding of the invention are represented therein, a person skilled in the art being capable of supplementing this representation in order to implement the invention.

DESCRIPTION OF THE EMBODIMENTS

The present invention provides for the removal of the acid compounds from an aqueous effluent by employing an aqueous absorbent solution, the composition of which is described in detail below. The process is described in greater length subsequent to the details relating to the composition of the absorbent solution.

Composition of the Absorbent Solution

The absorbent solution employed for the removal of the acid compounds contained in a gaseous effluent comprises:
water;
between 20% and 28% by weight of pentamethyldipropylenetriamine (PMDPTA); and
between 5% and 35% by weight of N-methyldiethanolamine (MDEA).

MDEA is a tertiary monoamine which, used in aqueous solution, constitutes a reference absorbent solution in the field of the deacidification of a gas, in particular for the selective absorption of $H_2S$ with respect to $CO_2$ which are contained in the gas.

PMDPTA is a tertiary polyamine, more specifically a tertiary triamine, of following formula:

Chemical Formula 1

It is known in the prior art that polyamines offer an advantage compared with monoamines by making it possible to achieve a higher number of reactive sites per unit of weight of product, with the potential of an increased absorption capacity. However, polyamines are not equivalent in terms of capacity for absorption of acid gases, of performance for the selective removal of $H_2S$ and of chemical stability under the conditions of the process for the treatment of acid gases. In addition, some polyamines, employed in aqueous solution, can result in a phenomenon of demixing, that is to say a separation into two liquid phases of the single-phase liquid absorbent solution, under certain conditions of temperature and of level of loading with acid gases.

The combination of PMDPTA and MDEA in aqueous solution in the concentrations indicated makes it possible to prevent separation of the absorbent solution into two liquid phases, that is to say a phenomenon of demixing, under the conditions of temperature and of loading level which are normally encountered during the phase of absorption and of circulation as far as the regenerator, while achieving particularly high capacities for absorption of acid gases.

The inventors have also demonstrated that, unexpectedly, the specific combination of these two amines in aqueous solution exhibits limited foaming in the presence of hydrocarbons and under degraded conditions of the absorbent solution, excellent properties of chemical stability, reduced corrosiveness with respect to the items of metal equipment used during the deacidification and very good performance qualities for the selective absorption of $H_2S$ with respect to $CO_2$ which are contained in a gaseous effluent to be treated.

According to one embodiment, the absorbent solution comprises between 10% and 30% by weight of MDEA.

The absorbent solution can contain between 37% and 75% by weight of water.

The absorbent solution preferably contains between 42% and 70% by weight of water when the solution contains between 10% and 30% by weight of MDEA.

Everywhere in the description, the sum of the fractions by weight, expressed as % by weight, of the different compounds of the absorbent solution is equal to 100% by weight of the virgin absorbent solution, i.e. the absorbent solution without taking into account the acid gases absorbed or other co-absorbed products or degradation products.

The concentration ranges are understood as limits included, unless otherwise specified.

In the present description, the pressures are expressed in absolute values, unless otherwise indicated.

According to one embodiment, the aqueous absorbent solution comprises from 20% to 25% by weight of PMDPTA and from 25% to 35% by weight of MDEA.

According to a particular embodiment, the absorbent solution consists of an aqueous solution composed of from 20% to 28% by weight of PMDPTA and from 5% to 35% by weight of MDEA, preferably composed of from 20% to 25% by weight of PMDPTA and from 25% to 35% by weight of MDEA.

According to a particular embodiment, the absorbent solution comprises:
water;
between 22% and 28% by weight of PMDPTA; and
between 5% and 35% by weight of MDEA.

In this case, the absorbent solution can consist of an aqueous solution composed of from 22% to 28% by weight of PMDPTA and from 5% to 35% by weight of MDEA and preferably composed of from 22% to 25% by weight of PMDPTA and from 25% to 35% by weight of MDEA.

According to another embodiment, the absorbent solution comprises:
water;
between 20% and 28% by weight of PMDPTA;
between 5% and 20% by weight of MDEA; and
between 0.5% and 20% by weight of at least one activating compound comprising a primary or secondary amine functional group chosen from the group consisting of:
piperazine;
1-methylpiperazine;
homopiperazine;
N-(2-hydroxyethyl)piperazine;
3-(methylamino)propylamine;
N,N'-dimethyl-1,6-hexanediamine;
N-methyl-1,6-hexanediamine;
N,N',N'-trimethyl-1,6-hexanediamine;
2-amino-2-methyl-1-propanol.

According to this embodiment, the absorbent solution can comprise a mixture of activating compounds as listed above, as is understood by the expression "at least one activating compound".

Activating compound is understood to mean a compound which makes it possible to accelerate the kinetics of absorption of $CO_2$ and in some cases of COS, which is (are) contained in the gas to be treated. In the present description, reference is made to an "activated solution" to denote an absorbent solution comprising such an activating compound.

According to the invention, such an activated solution is employed in particular for an application of non-selective deacidification of the gas to be treated, for example an application of total deacidification of the gas, that is to say when it is desired to remove the $CO_2$ and the COS in order to achieve very tight specifications, i.e. high purification performance qualities.

Preferably, according to this embodiment relating to an activated solution, the absorbent solution comprises between 0.5% and 10% by weight of the said at least one activating compound, preferably between 0.5% and 6% by weight of the said at least one activating compound and more preferably still between 1% and 6% by weight of the said at least one activating compound.

According to this embodiment relating to an activated solution, the concentration of MDEA in the absorbent solution is preferably between 5% and 15% by weight, preferably between 10% and 15% by weight. In this case, the absorbent solution can comprise between 0.5% and 10% by weight of the said at least one activating compound, preferably between 0.5% and 6% by weight of the said at least one activating compound and more preferably still between 1% and 6% by weight of the said at least one activating compound.

Preferably, according to this embodiment relating to an activated solution, the absorbent solution comprises at least one activating compound which is piperazine. More preferentially, the absorbent solution comprises an activating compound which is piperazine.

According to another preferred embodiment, the absorbent solution comprises, and can consist of:
water;
between 20% and 28% by weight of PMDPTA, preferably between 22% and 27% by weight of PMDPTA;
between 5% and 20% by weight of MDEA, preferably between 5% and 15% by weight of MDEA; and
between 0.5% and 20% by weight of piperazine, and preferably between 0.5% and 10% by weight of piperazine, more preferentially between 1% and 6% by weight of piperazine.

The water concentration is variable and represents the complement, by weight, to the sum of the other compounds included in the absorbent solution.

According to the invention, the water concentration is variable.

Preferably, the absorbent solution comprises at least 37% by weight of water and at most 75% by weight of water.

According to one embodiment, the absorbent solution contains organic compounds which are non-reactive with respect to the acid compounds, commonly known as "physical solvents", which make it possible to increase the solubility of at least one or more acid compounds of the gaseous effluent. Thus, according to this embodiment, the absorbent solution can comprise between 5% and 50% by weight of physical solvent.

For example, the absorbent solution can comprise at least one physical solvent, such as alcohols, ethers, ether alcohols, ethers of glycol and of polyethylene glycol, glycol thioethers, esters and alkoxyesters of glycol and of polyethylene glycol, glycerol esters, lactones, lactams, N-alkylated pyrrolidones, derivatives of morpholine,
of morpholin-3-one, imidazoles and imidazolidinones, N-alkylated piperidones,
cyclotetramethylene sulfones, N-alkylformamides, N-alkylacetamides, ether ketones alkyl carbonates or alkyl phosphates and their derivatives. By way of example and non-limitingly, the physical solvent can be methanol, ethanol, 2-ethoxyethanol,
triethylene glycol dimethyl ether, tetraethylene glycol dimethyl ether,
pentaethylene glycol dimethyl ether, hexaethylene glycol dimethyl ether,
heptaethylene glycol dimethyl ether, octaethylene glycol dimethyl ether, diethylene glycol butoxyacetate,
glycerol triacetate, sulfolane, N-methylpyrrolidone,
N-methylmorpholin-3-one, N,N-dimethylformamide, N-formylmorpholine, N,N'-dimethylimidazolidin-2-one, N-methylimidazole, ethylene glycol,
diethylene glycol, triethylene glycol, thiodiglycol, propylene carbonate or
tributyl phosphate.

Nature of the Gaseous Effluents

According to the invention, the absorbent solutions can be employed to deacidify the following gaseous effluents: natural gas, synthesis gas, combustion flue gases, refinery gases, acid gases resulting from an amine unit, tail gases resulting from a unit for the conversion of $H_2S$ to give sulfur by the Claus process, biogas, such as the gas resulting from biomass fermentation, gases from cement works or incinerator flue gases. These gaseous effluents contain one or more of the following acid compounds: $CO_2$, $H_2S$, mercaptans (for example, methyl mercaptan ($CH_3SH$), ethyl mercaptan ($CH_3CH_2SH$), propyl mercaptan ($CH_3CH_2CH_2SH$)), COS, $CS_2$ or $SO_2$.

Combustion flue gases are produced in particular by the combustion of hydrocarbons, biogas or coal in a boiler or for a combustion gas turbine, for example for the purpose of producing electricity. By way of illustration, it is possible to carry out a deacidification process according to the invention to absorb at least 70%, preferably at least 80%, indeed even at least 90%, of the $CO_2$ contained in the combustion flue gases. Such a removal of $CO_2$ can be denoted by the term "decarbonization" of the gas. These flue gases generally have a temperature of between 20° C. and 60° C., a pressure of between 0.1 MPa and 0.5 MPa and can comprise between 50% and 80% by volume of nitrogen ($N_2$), between 5% and 40% by volume of $CO_2$, between 1% and 20% by volume of oxygen ($O_2$), and a few impurities, such as $SO_x$ compounds and $NO_x$ compounds, if they were not removed upstream of the deacidification process. In particular, the deacidification process according to the invention is particularly well suited to absorbing the $CO_2$ contained in combustion flue gases comprising a low $CO_2$ partial pressure, for example a $CO_2$ partial pressure of less than 0.02 MPa.

The deacidification process according to the invention can be employed to deacidify a synthesis gas. The synthesis gas contains carbon monoxide CO, hydrogen $H_2$ (generally in an $H_2$/CO ratio equal to 2), water vapour (generally at saturation at the temperature at which the scrubbing is carried out) and $CO_2$ (of the order of approximately 10% by volume). The pressure is generally between 2 and 3 MPa but can reach up to 7 MPa. It can additionally contain sulfur-comprising impurities ($H_2S$, COS, and the like), nitrogen-comprising impurities ($NH_3$, HCN) and halogen-comprising impurities.

The deacidification process according to the invention can be employed to deacidify a natural gas. Natural gas is predominantly composed of gaseous hydrocarbons but can contain several of the following acid compounds: $CO_2$, $H_2S$, mercaptans, COS or $CS_2$. The content of these acid compounds is highly variable and can range up to 70% by volume for the $CO_2$ and up to 40% by volume for the $H_2S$. The temperature of the natural gas can be between 10° C. and 100° C. The pressure of the natural gas to be treated can be between 1 and 20 MPa. The invention can be employed to achieve specifications generally imposed on the deacidified gas, which are less than 2% by volume of $CO_2$, indeed even less than 50 ppm by volume of $CO_2$, in order to subsequently carry out a liquefaction of the natural gas, less than 4 ppm by volume of $H_2S$ and less than 50 ppm, indeed even less than 10 ppm, by volume of total sulfur.

The deacidification process according to the invention can be employed to deacidify biogases, typically gases resulting from biomass fermentation and generally pretreated in order to remove impurities, such as $H_2S$, mercaptans or siloxanes. These gases generally have a temperature of between 5° C. and 60° C., a pressure of between 0.1 and 2 MPa and can comprise between 30% and 75% by volume of methane, between 0% and 40% by volume of nitrogen ($N_2$), between 15% and 50% by volume of $CO_2$ and between 0% and 10% by volume of oxygen ($O_2$). In particular, the deacidification process according to the invention is advantageously employed to remove $CO_2$ from a biogas which has the distinguishing feature of generally containing a large amount of oxygen, for example from several tenths of a percent to several percent by volume of oxygen. It is known that amines are generally sensitive to oxygen and decompose more easily in the presence of oxygen. The invention is thus particularly well suited to the treatment of biogas, as a result in particular of the good chemical stability of the absorbent solution in the presence of oxygen.

Process for the Removal of the Acid Compounds in a Gaseous Effluent

The process for the removal of the acid compounds from a gaseous effluent according to the invention comprises a stage of absorption of the acid compounds by bringing the gaseous effluent into contact with the absorbent solution.

Figure 1:
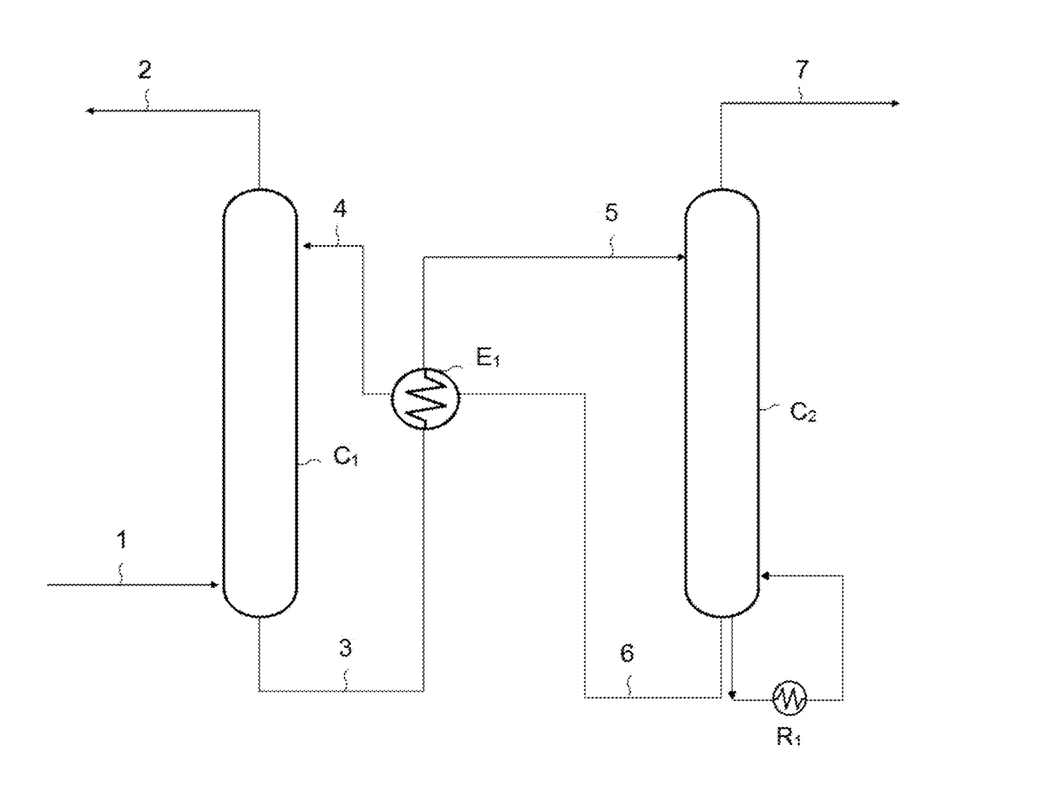

The absorption stage is followed by a regeneration stage, as represented in the scheme of FIG. 1.

In the present invention, the various ranges of parameters for a given stage, such as the pressure ranges and the temperature ranges, can be used alone or in combination. For example, in the present invention, a range of preferred pressure values can be combined with a more preferred range of temperature values.

With reference to FIG. 1, the plant for the deacidification of a gaseous effluent comprises an absorption column C1 provided with means for bringing gas and liquid into contact, for example a random packing, a structured packing or plates. The gaseous effluent to be treated is conveyed by a pipe 1 emerging at the bottom of the column C1. A pipe 4 makes possible the introduction of the absorbent solution at the top of the column C1. A pipe 2 makes possible the discharge of the treated (deacidified) gas and a pipe 3 makes it possible to convey the absorbent solution, enriched in acid compounds following the absorption, to a regeneration column C2. This regeneration column C2 is equipped with internal features for bringing gas and liquid into contact, for example plates, random packings or structured packings. The bottom of the column C2 is equipped with a reboiler R1 which contributes the heat necessary for the regeneration by vaporizing a fraction of the absorbent solution. The solution enriched in acid compounds is introduced at the top of the regeneration column C2 via a pipe 5. A pipe 7 makes it possible to discharge, at the summit of the column C2, the gas enriched in acid compounds which are released during the regeneration and a pipe 6 positioned at the bottom of the column C2 makes it possible to send the regenerated absorbent solution to the absorption column C1. A heat exchanger E1 makes it possible to recover the heat of the regenerated absorbent solution resulting from the column C2 in order to heat the absorbent solution enriched in acid compounds exiting from the absorption column C1.

The absorption stage consists in bringing the gaseous effluent arriving via the pipe 1 into contact with the absorbent solution arriving via the pipe 4. During contact, the amine functional groups of the molecules of the absorbent solution react with the acid compounds contained in the effluent, so as to obtain a gaseous effluent depleted in acid compounds which is discharged via the pipe 2 at the top of the column C1 and an absorbent solution enriched in acid compounds discharged via the pipe 3 at the bottom of the column C1 in order to be regenerated.

The stage of absorption of the acid compounds can be carried out at a pressure in the column C1 of between 0.1 MPa and 20 MPa, preferably, between 2 MPa and 10 MPa for the treatment of a natural gas and preferably between 0.1 MPa and 0.3 MPa for the treatment of industrial flue gases.

The stage of absorption of the acid compounds can be carried out at a temperature in the column C1 of between 20° C. and 100° C., preferentially of between 30° C. and 90° C., indeed even between 30° C. and 60° C.

The regeneration stage consists in particular in heating and optionally in reducing in pressure the absorbent solution enriched in acid compounds in order to release the acid compounds in the gaseous form. The absorbent solution enriched in acid compounds exiting from the column C1 is introduced into the heat exchanger E1, where it is heated by the flow circulating in the pipe 6 originating from the regeneration column C2. The heated solution at the outlet of E1 is introduced into the regeneration column C2 via the pipe 5 at a temperature generally of less than or equal to 110° C.

In the regeneration column C2, under the effect of bringing the absorbent solution arriving via the pipe 5 into contact with the vapour produced by the reboiler, the acid compounds are released in the gaseous form and discharged at the top of the column C2 via the pipe 7. The regenerated absorbent solution, that is to say the absorbent solution depleted in acid compounds, is discharged via the pipe 6 and is cooled in E1, then recycled to the absorption column C1 via the pipe 4.

The regeneration stage can be carried out by thermal regeneration, optionally supplemented by one or more pressure-reduction stages. For example, the absorbent solution enriched in acid compounds discharged via the pipe 3 can be sent, after optional heating, to a first flash drum (not represented), before it passes into the heat exchanger E1. In the case of a natural gas, the reduction in pressure makes it possible to obtain a gas discharged at the summit of the drum containing the majority of the aliphatic hydrocarbons co-absorbed by the absorbent solution. This gas can optionally be scrubbed by a fraction of the regenerated absorbent solution and the gas thus obtained can be used as fuel gas. The flash drum preferably operates at a pressure lower than that of the absorption column C1 and greater than that of the regeneration column C2. This pressure is generally set by the conditions of use of the fuel gas and is typically of the order of 0.2 to 1.5 MPa, preferably of 0.5 to 1.5 MPa. The flash drum operates at a temperature substantially identical to that of the absorbent solution obtained at the bottom of the absorption column C1.

The absorbent solution then comprises a reduced amount of acid gases after the pressure-reduction stage. It can be recycled in part to the absorption column C1 for a new absorption cycle in a particular implementation of the invention (not represented), possibly at a different level from the regenerated absorbent solution resulting from the column C2. In this case where the absorbent solution is partially recycled to the absorption column, the other part of the absorbent solution resulting from the pressure-reduction stage is introduced into the regeneration column C2.

In a particular implementation of the invention (not represented), the absorbent solution, after the pressure-reduction stage, is completely recycled to the absorption column C1 and no regeneration column C2 is employed.

The regeneration can be carried out at a pressure in the column C2 of between 0.1 MPa and 0.5 MPa, preferably between 0.1 MPa and 0.4 MPa, indeed even up to 1 MPa, and at a temperature in the column C2 of between 100° C. and 180° C., preferably of between 100° C. and 140° C., more preferentially of between 110° C. and 140° C., and more preferentially still of between 115° C. and 140° C., and in an even more preferred way between 115° C. and 130° C. For example, the regeneration temperature in the column C2 is between 115° C. and 130° C. in the cases where the acid gas is sent to the atmosphere or into a downstream treatment process, such as a Claus process or a tail gas treatment process.

According to a preferred embodiment, the regeneration is carried out at a pressure in the column C2 of between 0.1 MPa and 0.5 MPa, preferably between 0.1 MPa and 0.4 MPa, and at a temperature of between 110° C. and 140° C., more preferentially of between 115° C. and 130° C.

According to the invention, the liquid absorbent solution advantageously remains a single-phase solution during the phase of absorption in the absorption column C1 and during the circulation of the solution enriched in acid compounds up at least to the entry into the regeneration column C2. This is because the specific formulation of the absorbent solution makes it possible to minimize the risk of demixing of the absorbent solution during the absorption and the circulation of the solution up to the regeneration column. This is because such a demixing might be a source of operating problems. This is because, if the solution is in the form of two separate phases in the absorption column, the stream of acid compounds transferred from the gas to the absorbent solution is strongly impacted, and the column height consequently generally has to be adjusted (increase in the size of the column). This phenomenon thus presents implementational difficulties and, in view of the complexity of the system, is difficult to model. In addition, a solution in the form of two separate liquid phases may require the installation of separation devices (for example for separation by settling) upstream of the regeneration column, which adds to the complexity and to the costs of the process. Such problems are thus avoided in the process according to the invention.

According to the invention, the absorbent solution minimizes the corrosion of the items of equipment of the plant for the deacidification of a gaseous effluent, the surfaces of which, comprising a steel, are made to be in contact with the said solution.

These items of equipment can be composed of a low-alloy steel, also known as carbon steel, or of a stainless steel. Low-alloy steel is understood to mean a steel composed predominantly of iron, in particular of at least 90% by weight of iron, and of 0.01% to 2.5% by weight of carbon, and of at least one alloying element chosen from aluminium, chromium, cobalt, copper, manganese, molybdenum, nickel, niobium, phosphorus, silicon, titanium, tungsten or vanadium, the individual content of the said at least one alloying element being less than 5% by weight. This definition does not exclude the presence of other elements within the limit of 1% by weight. Stainless steels, which are less sensitive to corrosion, differ in their composition from low-alloy steels by a chromium content of greater than 11.5% by weight.

The items of equipment concerned are, non-limitingly, the absorption and regeneration columns where gas/liquid contact is carried out, the pipes connecting the different elements of the plant, the elements positioned inside the chambers, such as plates, structured or random packings, exchangers, the bodies of pumps and valves, or storage tanks.

According to the invention, the items of equipment comprise surfaces predominantly composed of steel, which does not, however, exclude the presence of other materials used in the manufacture of such items of equipment.

Due to its limited corrosive power, the absorbent solution makes it possible to limit the corrosion of the items of equipment of the deacidification plant and also to limit or dispense with the use of corrosion inhibitors in the process according to the invention.

Another advantage provided by the use of the absorbent solution for the deacidification of a gaseous effluent according to the process of the invention is the limitation of the foaming phenomenon. Foaming generally harms the performance qualities of the process and can even result in the shutdown of the unit. Foaming remains today a phenomenon which is difficult to control but nevertheless critical for the operation of the deacidification unit.

Unexpectedly, the absorbent solution makes it possible to limit foaming in the presence of aliphatic or aromatic hydrocarbons, which can be initially present in the gas to be treated, and/or under certain conditions of degradation of the solution, reflecting its conditions of use. It is thus possible to envisage limiting, or even dispensing with, the use of anti-foaming additives conventionally used to overcome the problem of the foaming of amine solutions. Thus, according to one embodiment, the absorbent solution does not comprise an anti-foaming additive.

Anti-foaming additive is understood to mean any additional compound or mixture of additional compounds in the absorbent solution, other than the mentioned compounds which can participate in the composition of the absorbent solution, which is capable of preventing the foaming of the absorbent solution or of removing a foam already formed.

Conventionally, the anti-foaming additive is used by an initial metering consisting of a regular injection of an anti-foaming solution into the absorbent solution in order to achieve a few tenths of a percent by weight, and then this metering is adjusted according to the level of foaming observed on the unit. Use is conventionally made of silicon-based organic compounds, such as polydialkylsiloxanes or silicone resins, generally as an emulsion in water. It is noted that the excessive or inappropriate use of anti-foaming additives is known to aggravate the foaming problem, which makes the use of such additives difficult to manage.

A test which can advantageously be used in the laboratory to characterize the foaming power of a solution and/or the need to use an anti-foaming additive consists in determining the height of foam generated in a cylindrical glass container of graduated measuring cylinder type, subsequent to the stirring of the solution, the height of foam being expressed as percentage with respect to the initial height of the solution, as a function of the time.

It is, for example, carried out at 20° C. on a volume of 50 ml of solution, placed in a 250 ml beaker, and stirred using a 5-blade stirrer at 1200 rev/min for 4 minutes. As soon as stirring is halted, the height of foam generated above the surface of the solution is measured immediately (t0) and at 30 seconds and is expressed as percentage of the initial height. The uncertainty in the measurement corresponds to 2.5% of the initial height.

According to the invention, the absorbent solution exhibits a resistance to degradation, in particular in the presence of oxygen, thus limiting the production of by-products which promote corrosion by phenomena well known to a person skilled in the art. Mention is also made, in the present description, of chemical stability to express this resistance to degradation, in particular at high temperatures, such as those operated during the regeneration of the absorbent solution.

The process according to the invention advantageously makes possible selective removal of $H_2S$ with respect to $CO_2$ in the gas to be treated, for example natural gas. This is because the absorbent solution shows good performance qualities for this type of application, in particular relatively slow kinetics of absorption of $CO_2$ with a high capacity for absorption of $H_2S$, which make possible effective selective removal and also the possibility of reducing the flow rates of absorbent solution employed.

The process according to the invention can advantageously be employed for a non-selective deacidification of a gaseous effluent, for example for the decarbonization of a combustion flue gas or the decarbonization of a biogas, in particular due to the good performance qualities of the activated absorbent solutions, in terms of capacity for absorption of acid gases, in particular $CO_2$, but also in terms of kinetics of absorption of $CO_2$, and of chemical stability.

EXAMPLES

The examples below illustrate, in a non-limiting way, the performance qualities of absorbent solutions employed according to the invention for the purpose of removing acid compounds, such as $CO_2$ or $H_2S$, contained in a gaseous effluent.

Use is made, as absorbent solutions in these examples, of aqueous solutions of PMDPTA in combination with MDEA. The compositions of these solutions employed in a process according to the invention are summarized in Table 1 below.

Some absorbent solutions also contain piperazine (Pz), used as activator.

TABLE 1

| | |
|---|---|
| Absorbent solution A | PMDPTA (22% by weight) + MDEA (28% by weight) + $H_2O$ |
| Absorbent solution B | PMDPTA (27% by weight) + MDEA (13% by weight) + Pz (5% by weight) + $H_2O$ |

In a first step (Examples 1 and 2), it is shown that certain physicochemical properties of the absorbent solutions A and B, in particular the miscibility of the constituents, are very different from those of aqueous solutions of PMDPTA according to the prior art, with or without Pz.

The compositions of the absorbent solutions according to the prior art which are used, based on PMDPTA (absorbent solutions C, D, E), are given in Table 2 below, and also an absorbent solution F based on another polyamine, pentamethyldiethylenetriamine (PMDETA) (according to the document WO04082809 or U.S. Pat. No. 6,267,939), and two other absorbent solutions M and N based on another polyamine, N,N,N',N'-tetramethyldipropylenetriamine (TMDPTA), disclosed, for example, in the documents U.S. Pat. No. 6,267,939 or WO09156273A2.

TABLE 2

| | |
|---|---|
| Absorbent solution C | PMDPTA (50% by weight) + $H_2O$ |
| Absorbent solution D | PMDPTA (45% by weight) + $H_2O$ |
| Absorbent solution E | PMDPTA (30% by weight) + $H_2O$ |
| Absorbent solution F | PMDETA (50% by weight) + $H_2O$ |
| Absorbent solution G | PMDPTA (30% by weight) + MDEA (10% by weight) + Pz (5% by weight) + $H_2O$ |
| Absorbent solution M | TMDPTA (50% by weight) + $H_2O$ |
| Absorbent solution N | TMDPTA (27% by weight) + MDEA (13% by weight) + Pz (5% by weight) + $H_2O$ |

In Examples 3 to 5, the advantages of the absorbent solutions employed according to the invention, in terms of chemical stability, of limitation of corrosion and foaming problems, are illustrated, in comparison with various aqueous solutions of MDEA with or without Pz, the absorbent solutions of which are shown in Table 3 below. The absorbent solutions given in Table 3 constitute reference solvents for the treatment of acid gases. Some characteristics of the solutions employed in the process according to the invention are also compared with those of a 40% by weight aqueous solution of diethanolamine (DEA) (absorbent solution x given in Table 3), which is also a reference solvent for the treatment of acid gases.

TABLE 3

| | |
|---|---|
| Absorbent solution H | MDEA (50% by weight) + $H_2O$ |
| Absorbent solution I | MDEA (47% by weight) + $H_2O$ |
| Absorbent solution J | MDEA (45% by weight) + $H_2O$ |
| Absorbent solution K | MDEA (39% by weight) + Pz (6% by weight) + $H_2O$ |
| Absorbent solution L | MDEA (40% by weight) + Pz (3.3% by weight) + $H_2O$ |
| Absorbent solution x | DEA (40% by weight) + $H_2O$ |

In the absorbent solutions given in Tables 1 to 3, the sum of the fractions by weight, expressed as % by weight of the various compounds and of the water, is equal to 100% by weight of the virgin absorbent solution, i.e. the absorbent solution without taking into account the absorbed acid gases or other co-absorbed products or degradation products.

In Example 3, the chemical stability of the absorbent solution B is compared with that of the absorbent solution according to the prior art K based on MDEA and on Pz, and also with that of the absorbent solution F according to the documents WO04082809 and U.S. Pat. No. 6,267,939. The chemical stability of the absorbent solution B is also compared with that of the absorbent solution according to the prior art M containing 50% of TMDPTA, and that of the absorbent solution according to the prior art N containing 25% of TMDPTA, 15% of MDEA and 5% of Pz, a solution similar to the absorbent solution B according to the invention but in which the PMDPTA is replaced by TMDPTA.

In Example 4, the corrosiveness of the absorbent solutions A and B is compared with that of the absorbent solution according to the prior art J based on MDEA, with that of the absorbent solution according to the prior art L based on MDEA and on Pz, and also with that of a 40% by weight aqueous solution of DEA.

Finally, in Example 5, the foaming characteristics of absorbent solutions A and B are compared with those of the absorbent solution according to the prior art J based on MDEA and of the absorbent solution K according to the prior art based on MDEA and on Pz.

Example 1: Miscibility at 40° C. Effect of the Level of Loading with $CO_2$

The demixing phenomenon observed in the aqueous solutions of PMDPTA loaded with $CO_2$ as described in the document FR 2 877 858 can be eliminated by combining the PMDPTA with MDEA in the proportions defined according to the invention. This absorbent solution consists in replacing a certain percentage by weight of PMDPTA with an equivalent percentage by weight of MDEA according to the invention.

According to the composition of the absorbent solution based on PMDPTA and the composition of the gas to be treated, in particular the $CO_2$ partial pressure, a liquid/liquid phase separation can take place, known under the name of demixing. The conditions under which demixing takes place for a given absorbent solution (i.e. given concentrations of the amines and of the water), at 40° C., are determined by laboratory tests (in perfectly stirred gas/liquid reactors) by gradually increasing the $CO_2$ partial pressure and thus the level of loading with $CO_2$ ($\alpha = n_{acid\ gas}/n_{amine}$ with $n_{acid\ gas}$ the number of moles of acid gas and $n_{amine}$ the number of moles of amine in the liquid solution) at the physicochemical equilibrium.

According to the results of these laboratory tests, the absorbent solution can be employed in a deacidification process as described in FIG. 1. An absorbent solution based on PMDPTA and on MDEA as defined according to the invention is particularly suitable for this type of process as it remains a single-phase solution under the operating conditions corresponding to those of the absorption column (i.e. generally 40° C.).

The liquid/liquid equilibria at 40° C. are concerned here, which corresponds to the low temperatures in an absorption column. The laboratory tests are carried out for the absorbent solutions A and C having a concentration of tertiary amine of 50% by weight. The results obtained for the various absorbent solutions are summarized in Table 4 below.

TABLE 4

| Absorbent solution | [PMDPTA] (% by weight) | [MDEA] (% by weight) | Loading level where the two-phase zone is entered | Loading level where the two-phase zone is left no demixing by rise in the loading level for $PPCO_2 < 0.3$ MPa (i.e. up to a loading level of 1.24) |
|---|---|---|---|---|
| | | | 0.7 | 1.5 |

It is found, according to the results of Table 4, that the solution A makes it possible to have a single-phase absorbent solution under the operating conditions representative of those of the absorption column (in the example, 0.3 MPa of $CO_2$ partial pressure and 40° C., corresponding to a level of loading with $CO_2$ of 1.24).

On the other hand, it is seen that an absorbent solution containing 50% of PMDPTA according to the prior art (solution C) exhibits a demixing phenomenon for a level of loading of between 0.7 and 1.5.

Example 2: Effect of the Temperature on the Miscibility

The demixing phenomenon observed in the aqueous solutions of PMDPTA can be eliminated by combining the PMDPTA with MDEA in the proportions defined according to the invention. This specific combination also makes it possible to prevent any demixing phenomenon observed on PMDPTA solutions without activator or else in the presence of an activator, such as piperazine.

Depending on the composition of the absorbent solution based on PMDPTA and the optional presence of a primary or secondary amine, and the temperature of the absorbent solution, a liquid/liquid phase separation may take place (demixing phenomenon).

The temperature at which the demixing takes place for a given absorbent solution (i.e. given concentrations of the amines and of the water) is determined by laboratory tests in a thermostatically controlled oil bath, by gradually increasing the temperature of the bath in which a sample of the said absorbent solution is immersed. The phenomenon of demixing is detected by observing the change in the transparency of the mixture: the mixture becomes cloudy when demixing appears.

According to the results of these laboratory tests, the absorbent solution can be employed in a deacidification process as described in FIG. 1. An absorbent solution based on PMDPTA and on MDEA in the proportions defined by the invention is particularly suitable for this type of process as it makes it possible to remain single-phase under the temperature conditions after passing through the load/effluent exchanger (generally less than or equal to 110° C.).

The laboratory tests are carried out for activated absorbent solutions (B and G) having a concentration of tertiary amine(s) of 40% by weight and a Pz concentration of 5% by weight. The results obtained for different absorbent solutions are summarized in Table 5 below. The solutions are loaded with $CO_2$ at a loading level of 1 mol/mole of amine, representative of the conditions at the load/effluent exchanger outlet.

TABLE 5

| Absorbent solution | [PMDPTA] (% by weight) | [MDEA] (% by weight) | [Pz] (% by weight) | Temperature (T) at which demixing takes place (° C.) no demixing by rise in temperature for T ≤ 110° C. no demixing by rise in temperature for T ≤ 110° C. |
|---|---|---|---|---|
| | 30 | 10 | 5 | 95 |

It is found, according to the results of Table 5, that the absorbent solutions employed according to the invention (solutions A and B) make it possible to completely eliminate the demixing phenomenon, which phenomenon is observed with the solutions according to the prior art C and G. The absorbent solutions A and B are thus advantageous as they make it possible to have a single-phase absorbent solution under conditions of level of loading with $CO_2$ and of temperature corresponding to the outlet of the load/effluent exchanger (generally less than or equal to 110° C.).

On the other hand, it is seen that a solution loaded with $CO_2$ containing 50% of PMDPTA (solution C according to the prior art) or 30% of PMDPTA and 5% of Pz (solution G according to the prior art) exhibits a demixing phenomenon for a temperature of less than 110° C., i.e. 95° C. for the solution G and 40° C. for the solution C.

Example 3: Stability of Absorbent Solutions

The amines of the absorbent solution employed according to the invention exhibit the distinguishing feature of being particularly resistant to the degradations which can take place in a deacidification unit.

A degradation test is carried out on absorbent solutions within a closed reactor, the temperature of which is controlled by a regulating system. For each solution, the test is carried out with a liquid volume of 100 cm³ injected into the reactor. The solution is degassed beforehand from all the dissolved contaminants by maintaining a vacuum, before any injection of gas, and the reactor is subsequently placed in a heating jacket at the set temperature and put under magnetic stirring. The liquid volume is subsequently flushed at 60° C. overnight under a total pressure of 0.2 MPa by a gas stream of 23 Sl/h consisting of a mixture of nitrogen and $CO_2$ at a partial pressure of 0.17 MPa, so as to achieve a loading level representative of a loaded solution at the absorber bottom. After saturation, the absorbent solution saturated with $CO_2$ is heated in a closed reactor at 140° C. for a period of time of 15 days. The solution is subsequently cooled to 80° C. and then flushed at this temperature by a stream of 30 Sl/h of nitrogen at a pressure of 0.2 MPa in order to remove the $CO_2$. The solution is subsequently analysed in order to determine the concentration of residual amine.

The influence of oxygen on the degradation of the absorbent solution can also be studied by replacing a portion of the nitrogen by air during the phase of saturation at 60° C. and by extending this phase for 3 days. The air and nitrogen flow rates and also the total pressure are adjusted in order to achieve the desired oxygen partial pressure while maintaining the $CO_2$ partial pressure at 0.17 MPa during the saturation phase.

The relative degradation rate, by degradation under $CO_2$, of the solution B, of the solution according to the prior art M based on TMDPTA, of the solution according to the prior art N, similar to the solution B but in which the PMDPTA is replaced by TMDPTA, of the solution F according to the prior art containing 50% of PMDETA, and also of the reference absorbent solution K containing 39% by weight of MDEA and 6% by weight of Pz, for a period of time of 15 days under $CO_2$ pressure in the absence of oxygen in the loading phase, is given in Table 6 below. The relative degradation rate is calculated by the ratio of the degradation rate of the amines of the absorbent solution divided by that of the absorbent solution K under the same experimental conditions.

The degradation rate (DR) for amines is calculated by the equation below:

$$DR (\%) = \frac{[A]w_{final} - [A]°w_{initial}}{[A]°w_{initial}}$$

where:

[A] is the total concentration of amines in the degraded solution,

[A]° is the total concentration of amines in the non-degraded solution, and $w_{initial}$ and $w_{final}$ are the weights of solution before and after the degradation test.

The concentrations [A] and [A]° are determined by gas chromatography.

TABLE 6

| Absorbent solution | Concentrations of amines (% by weight) of the absorbent solution (remainder as water) | Relative DR |
|---|---|---|
| | 27% PMDPTA + 13% MDEA + 5% Pz | 1 |
| | 27% TMDPTA + 13% MDEA + 5% Pz | 1.3 |
| | 50% PMDETA | 6 |
| | 50% TMDPTA | 6.3 |
| | 39% MDEA + 6% Pz | 1 |

The relative degradation rate DR, for a period of time of 15 days under $CO_2$ pressure in the presence of oxygen in the saturated loading phase, the oxygen partial pressure being maintained at 0.02 MPa for 3 days, is given in Table 7 below.

TABLE 7

| Absorbent solution | [PMDPTA] (% by weight) | [MDEA] (% by weight) | [Pz] (% by weight) | Relative DR |
|---|---|---|---|---|
| | 27 | 13 | 5 | 0.8 |
| | 0 | 39 | 6 | 1 |

This example, according to Table 6, shows that the polyamines described in the prior art are not equivalent in terms of chemical stability in comparison with the reference solutions and with the solutions employed according to the invention.

The absorbent solution employed according to the invention exhibits a chemical stability under $CO_2$ pressure and in the absence of oxygen comparable to that of a reference solution, unlike polyamine solutions according to the prior art.

Furthermore, the absorbent solution employed according to the invention exhibits an increased resistance to oxygen in comparison with the reference solution K, according to Table 7.

This is particularly advantageous for amine units for the treatment of synthesis gas (syngas) and natural gas, which generally guard against degradation by oxygen by particular precautions, or in the case of the capturing of $CO_2$ in post-combustion, or decarbonization applications in the treatment of biogas resulting from biomass fermentation which can contain from several tenths of a percent to several percent by volume of oxygen.

Example 4: Corrosiveness of Absorbent Solutions

The resistance to corrosion of the metallurgies used in processes is an important point to be confirmed during the introduction of new technologies.

The corrosiveness of absorbent solutions was studied by autoclave tests under conditions more severe than those of the application. The results could be compared with tests carried out on different reference absorbent solutions: a solution of MDEA (solution J), a solution comprising a mixture of MDEA and of Pz (solution L) and an aqueous solution of DEA (40% by weight of DEA and 60% by weight of water).

As it is known that the corrosiveness of amine solutions is greater in the presence of degradation products, a first phase consisted in degrading the solutions A and B at 140° C. under 3.5 MPa of $CO_2$ for a week.

These degraded solutions were subsequently used to carry out corrosion tests on lengths of AISI 1020 carbon steel and of AISI 316L stainless steel, the chemical compositions of which are given in Table 8 below (values given as % by weight). Iron, not expressed in Table 8, is the predominant element for all these alloys.

TABLE 8

| 0.01 | 0.01 | <0.005 | 0.17 | 0.75 | 0.01 | 0.003 |
|---|---|---|---|---|---|---|
| 16.86 | 10.30 | 2.18 | 0.02 | 1.34 | 0.45 | 0.002 |

A first test was carried out at 110° C. under 3.5 MPa of $CO_2$ in order to represent the loaded solution under the conditions of temperature and of level of loading with $CO_2$ representative of extreme conditions which may be encountered between the bottom of the absorber and the inlet of the regenerator.

A second test was carried out, after extraction (by stripping) of the $CO_2$ from the preceding solution, at 135° C. under nitrogen, in order to represent the condition of the absorbent solution at the regenerator outlet (regenerated solution at a loading level of less than 0.1 mol/mol).

For each test, two lengths of carbon steel and two lengths of stainless steel are placed on a rotational mounting (peripheral speed close to 0.4 m/s). These lengths are provided in the form of a sheet with a side length of 26 mm and a thickness of 1 mm. Before each test, each sample is polished with grade 600 sandpaper, then carefully degreased in ethanol, and rinsed with deionized water, and weighed.

At the end of the test, appropriate surface cleaning is carried out on each sample before weighing, in order to remove the deposits of corrosion product, the method described in the document ASTM G1 being followed.

The rate of corrosion is calculated from the variation in weight and is expressed in μm/year.

The rates of corrosion obtained during these tests are given in Table 13 (data of the first test) and Table 14 (data of the second test) below and are compared with those obtained during similar tests carried out in the solution J and the solution L.

The rates of corrosion (μm/year) measured after 4 weeks of testing under loaded rich condition (saturated under 3.5 MPa of $CO_2$) and at 110° C. are presented in Table 9.

The rates of corrosion (μm/year) measured after 4 weeks of testing under lean condition (loading level of less than 0.1 mol/mol) and at 135° C. (solutions A and B) or 120° C. (reference solutions) are presented in Table 10.

It turns out that the absorbent solutions employed according to the invention are less corrosive than the reference solutions.

TABLE 9

| Absorbent solution | Concentrations of amines (% by weight) of the absorbent solution (remainder as water) | Rate of corrosion on AISI 1020 carbon steel (μm/year) | Rate of corrosion on AISI 316L stainless steel (μm/year) |
|---|---|---|---|
| | 22% PMDPTA + 28% MDEA | 6 | <1 |
| | 27% PMDPTA + 13% MDEA + 5% Pz | 10 | <2 |
| | 45% MDEA | 21 | <5 |
| | 40% MDEA + 3.3% Pz | 12 | <5 |
| | 40% DEA | 145 | 15 |

TABLE 10

| Absorbent solution | Concentrations of amines (% by weight) of the absorbent solution (remainder as water) | Rate of corrosion on AISI 1020 carbon steel (μm/year) | Rate of corrosion on AISI 316L stainless steel (μm/year) |
|---|---|---|---|
| | 22% PMDPTA + 28% MDEA | <2 | <1 |
| | 27% PMDPTA + 13% MDEA + 5% Pz | <1 | <2 |
| | 45% MDEA | 11 | <5 |
| | 40% MDEA + 3.3% Pz | <5 | <5 |
| X | 40% DEA | 2040 | 15 |

Example 5: Foaming of Absorbent Solutions Saturated with Hydrocarbons or Containing Compounds Resulting from the Degradation of the Amines The foaming test carried out makes it possible to evaluate the foaming power of absorbent solutions. The foaming test consists in determining the height of foam generated following the stirring of the solution; the test is expressed as percentage with respect to the initial height of the solution, as a function of the time.

It is carried out at 20° C. on a volume of 50 ml of solution, placed in a 250 ml beaker, and stirred using a 5-blade stirrer at 1200 rev/min for 4 minutes.

As soon as stirring is halted, the height of foam generated above the surface of the solution is measured immediately (t0) and at 30 seconds and is expressed as percentage of the initial height of liquid.

The uncertainty in the measurement is evaluated at 2.5% of the initial height.

The study is carried out on the reference absorbent solutions J and K and on the absorbent solutions A and B according to the invention.

On the absorbent solutions A and J, the effect on the foaming of certain anionic products generally resulting from the oxidizing degradation of amines is observed. In order to represent the composition of an aged solution, various carboxylic acids were added to the absorbent solutions A and J in the following amounts, expressed as ppm by weight with respect to the fresh absorbent solution, i.e. 3000 ppm by weight of glycolic acid, 500 ppm by weight of oxalic acid, 40 000 ppm by weight of formic acid and 6000 ppm by weight of acetic acid, i.e. a total amount of carboxylic acid added representing 4.95% of the weight of fresh absorbent solution.

In order to observe their foaming power on absorbent solutions of acid gas in gaseous effluents containing hydrocarbons, the absorbent solutions B and K activated with Pz are saturated with n-hexane or toluene by bringing the absorbent solution into contact with a few millilitres of these compounds at ambient temperature. The solutions B and K saturated with hydrocarbons are subsequently recovered by separation by settling before being subjected to the foaming test.

Finally, the foaming power of the absorbent solution B according to the invention is compared with the reference absorbent solution K and the absorbent solution G according to the prior art, which are degraded under the conditions described in the absence of oxygen in Example 7 and to which a mixture of carboxylic acids representing 4.95% of the weight of the degraded absorbent solution, the composition of which is indicated above, has been added.

The height of foam, expressed as percentage of the height before stirring, observed on halting the stirring and after 30 seconds, in the absorbent solutions A and J in the presence of carboxylic acids is presented in Table 11.

TABLE 11

| Absorbent solution | Concentrations of amines (% by weight) of the absorbent solution (remainder as water) | Height of foam generated (%) after stirring as a function of the time (s) t = 30 |
|---|---|---|
| J + 4.95% acids | 45% MDEA | 7.5    0 |
| A + 4.95% acids | 22% PMDPTA + 28% MDEA | <2.5    0 |

It turns out that, under the conditions of the test, in the presence of acid compounds representative of an oxidizing degradation, the absorbent solution A according to the invention does not exhibit a significant foaming effect, whereas the reference absorbent solution J exhibits, under the same stirring conditions, a tendency towards foaming.

The height of foam, expressed as percentage of the height before stirring, observed on halting the stirring and after 30 seconds, in the absorbent solutions B and K saturated with n-hexane or with toluene is presented in Table 12.

TABLE 12

| Absorbent solution | Concentrations of amines (% by weight) of the absorbent solution (remainder as water) | Height of foam generated (%) after stirring as a function of the time (s) t = 0 | t = 30 |
|---|---|---|---|
| K saturated with n-hexane | 39% MDEA + 6% Pz | 9.5 | 2.4 |
| B saturated with n-hexane | 27% PMDPTA + 13% MDEA + 5% Pz | 2.4 | 2.4 |
| K saturated with toluene | 39% MDEA + 6% Pz | 12 | 2.4 |
| B saturated with toluene | 27% PMDPTA + 13% MDEA + 5% Pz | 7 | 1.2 |

It turns out that, under the conditions of the test, the solution B according to the invention saturated with n-hexane does not exhibit a significant foaming effect, whereas the reference absorbent solution K based on MDEA and on Pz saturated with n-hexane exhibits, under the same stirring conditions, a tendency towards foaming.

It also turns out that, in the presence of toluene, the absorbent solution B according to the invention exhibits a foaming factor which is virtually halved with respect to the reference solution K based on MDEA and on Pz.

This noteworthy effect makes it possible, for example, to envisage, with the use of the absorbent solution according to the invention, a delay in obstruction in comparison with the reference absorbent solution on an absorption column and, all things otherwise being equal, an increase in capacity of an existing gas treatment unit, that is to say an increase in the flow rate of acid gas which can be treated for a given flow rate of solvent.

For the construction of new plants for the treatment of acid gases containing hydrocarbons, as in the case of natural gas, and employing the absorbent solution according to the invention, it is also possible to envisage a reduction in the diameter of the absorption columns and thus the cost of the latter, in comparison with the usual dimensioning rules for the reference absorbent solution, for a given flow rate of gas and a given flow rate of absorbent solution.

The height of foam, expressed as percentage of the height before stirring, observed on halting the stirring and after 30 seconds, in the absorbent solutions B, G and K degraded under the conditions of degradation in the absence of oxygen which are defined in Example 7, and to which a mixture of carboxylic acids representing 4.95% by weight of the degraded solution and the composition of which is described above has been added, is presented in Table 13.

TABLE 13

| Absorbent solution | Concentrations of amines (% by weight) of the absorbent solution (remainder as water) | Height of foam generated (%) after stirring as a function of the time (s) |   |
|---|---|---|---|
| K degraded + 4.95% acids | 39% MDEA + 6% Pz | 21 | 17 |
| B degraded + 4.95% acids | 27% PMDPTA + 13% MDEA + 5% Pz | 10 | 10 |

TABLE 13-continued

| Absorbent solution | Concentrations of amines (% by weight) of the absorbent solution (remainder as water) | Height of foam generated (%) after stirring as a function of the time (s) | |
|---|---|---|---|
| G degraded + 4.95% acids | 30% PMDPTA + 10% MDEA + 5% Pz | 7 | 19 |

It turns out that, under the conditions of the test, the solution degraded starting from the solution B according to the invention exhibits a foaming effect reduced by a factor of 2 in comparison with the absorbent solution degraded under the same conditions starting from the reference solution K based on MDEA and on Pz. Surprisingly, it is also found that the absorbent solution degraded starting from the absorbent solution B according to the invention containing 27% of PMDPTA exhibits, after 30 seconds, a tendency towards foaming which is also reduced by a factor of 2 in comparison with the absorbent solution degraded starting from the absorbent solution G according to the prior art containing 30% of PMDPTA, which exhibits a delay effect in the appearance of the foam.

The invention claimed is:

1. Process for the removal of the acid compounds contained in a gaseous effluent comprising carrying out a stage of absorption of the acid compounds by bringing the gaseous effluent into contact with an absorbent solution, said absorbent solution comprising:
   water;
   between 20% and 28% by weight of pentamethyldipropylenetriamine;
   between 5% and 35% by weight of N-methyldiethanolamine.

2. Process according to claim 1, in which the absorbent solution comprises between 10% and 30% by weight of N-methyldiethanolamine.

3. Process according to claim 1, in which the absorbent solution comprises between 37% and 75% by weight of water.

4. Process according to claim 1, in which the absorbent solution comprises:
   between 5% and 20% by weight of N-methyldiethanolamine; and
   between 0.5% and 20% by weight of at least one activating compound comprising a primary or secondary amine functional group chosen from the group consisting of:
   piperazine;
   1-methylpiperazine;
   homopiperazine;
   N-(2-hydroxyethyl) piperazine;
   3-(methylamino) propylamine;
   N,N'-dimethyl-1,6-hexanediamine;
   N-methyl-1,6-hexanediamine;
   N,N',N'-trimethyl-1,6-hexanediamine;
   2-amino-2-methyl-1-propanol.

5. Process according to claim 4, in which the absorbent solution comprises between 5% and 15% by weight of N-methyldiethanolamine.

6. Process according to claim 4, in which the activating compound is piperazine.

7. Process according to claim 4, in which the absorbent solution comprises between 0.5% and 10% by weight of the said at least one activating compound.

8. Process according to claim 1, in which the absorbent solution additionally comprises at least one physical solvent chosen from the group consisting of methanol, ethanol, 2-ethoxyethanol, triethylene glycol dimethyl ether, tetraethylene glycol dimethyl ether, pentaethylene glycol dimethyl ether, hexaethylene glycol dimethyl ether, heptaethylene glycol dimethyl ether, octaethylene glycol dimethyl ether, diethylene glycol butoxyacetate, glycerol triacetate, sulfolane, N-methylpyrrolidone, N-methylmorpholin-3-one, N,N-dimethylformamide, N-formylmorpholine, N,N'-dimethylimidazolidin-2-one, N-methylimidazole, ethylene glycol, diethylene glycol, triethylene glycol, thiodiglycol, propylene carbonate and tributyl phosphate.

9. Process according to claim 1, in which the absorbent solution does not comprise an anti-foaming additive.

10. Process according to claim 1, in which the stage of absorption of the acid compounds is carried out at a pressure of between 0.1 MPa and 20 MPa and at a temperature of between 20° C. and 100° C.

11. Process according to claim 1, in which an absorbent solution loaded with acid compounds is obtained after the absorption stage, said process comprising carrying out at least one stage of regeneration of the said absorbent solution loaded with acid compounds at a pressure of between 0.1 MPa and 1 MPa and at a temperature of between 100° C. and 180° C.

12. Process according to claim 11, in which the absorbent solution is a single-phase solution during the absorption stage within an absorption column and up to at least the entry into a regeneration column in which the regeneration stage is carried out.

13. Process according to claim 1, In which the gaseous effluent is chosen from natural gas, synthesis gas, combustion flue gases, refinery gases, acid gases resulting from an amine unit, tail gases resulting from a unit for the conversion of H2S to give sulfur by the Claus process, gases resulting from biomass fermentation, gases from cement works or incinerator flue gases.

14. Process for the selective removal of $H_2S$ with respect to $CO_2$ from a gaseous effluent comprising selectively removing $H_2S$ from the gaseous effluent by the process according to claim 1, wherein the gaseous effluent is a biogas.

15. Process for the decarbonization of a gaseous effluent comprising removing $CO_2$ from the gaseous effluent by the process according to claim 1, wherein the gaseous effluent is a biogas.

16. Process according to claim 2, in which the absorbent solution comprises between 42% and 70% by weight of water.

17. Process according to claim 5, in which the absorbent solution comprises between 10% and 15% of N-methyldiethanolamine.

18. Process according to claim 4, in which the absorbent solution comprises between 0.5% and 6% by weight of the said at least one activating compound.

19. Process according to claim 4, in which the absorbent solution comprises between 1% and 6% by weight of the said at least one activating compound.

20. Process according to claim 12, in which the absorbent solution has a temperature of less than or equal to 110° C. in the absorption column and up to at least the entry into the regeneration column.

* * * * *